Patented Apr. 6, 1948

2,439,229

UNITED STATES PATENT OFFICE 2,439,229

ROCKY MOUNTAIN SPOTTED FEVER DIAGNOSTIC ANTIGEN AND PREPARATION OF THE SAME

James Vanderscheer, Ridgewood, and Elizabeth H. Hull, Allendale, N. J., assignors, by mesne assignments, to American Cyanamid Company, New York, N. Y., a corporation of Maine No Drawing. Application April 15, 1944, Serial No. 531,288

8 Claims. (Cl. 167—78)

This invention relates to a diagnostic antigen for Rocky Mountain spotted fever and to a method of preparing the same.

Rocky Mountain spotted fever is generally contracted from the bite of an infected wood tick. The disease, while formerly noted only in the western part of our country, is now found in practically all parts of the country. Recovery from the disease is dependent upon correct diagnosis and the instituting of proper treatment immediately thereafter, hence the need for an efficient, accurate, diagnostic agent.

In the past it has been difficult to differentiate clinically between typhus fever and Rocky Mountain spotted fever, particularly where both diseases occur in the same region. It is known that Rocky Mountain spotted fever can be diagnosed by isolation of virus from the patient, but this can only be performed satisfactorily if guinea pigs are inoculated immediately upon withdrawal of the blood, which has usually proved impractical, if not impossible.

It is also known that the Weil-Felix test, agglutination with proteus X 19, may indicate the presence of a Rickettsial disease, but in certain cases the test may be questionable and cannot specifically differentiate between typhus and Rocky Mountain spotted fever. The agglutination test, using either typhus or Rocky Mountain spotted fever Rickettsial, has not proved entirely satisfactory.

This invention is primarily directed to a complement fixation type diagnostic reagent and has as one of its principal objects the preparation of an antigen suitable for the specific diagnosis of Rocky Mountain spotted fever.

A further object of the invention is to prepare an antigen capable of quickly and accurately differentiating between Rocky Mountain spotted fever and typhus fever, whether of epidemic or endemic type.

A still further object is to prepare a Rocky Mountain spotted fever antigen by inoculating the yolk sac of fowl embryos with the virus of Rocky Mountain spotted fever and extracting therefrom an antigen effective in the diagnosis of Rocky Mountain spotted fever.

We have discovered that we can obtain a highly effective diagnostic antigen for Rocky Mountain spotted fever from the Rocky Mountain spotted fever virus that has been propagated in the yolk sac of fowl embryos and made into a vaccine as hereinafter described. By our process the virus so produced is inactivated and an antigen-containing product is obtained which has been found particularly useful in the accurate diagnosis of Rocky Mountain spotted fever where epidemic or endemic typhus fever might also be suspected.

The following specific example, given by way of illustration, describes one specific method of preparing our antigen for diagnostic purposes.

Fertile chicken eggs are incubated at 37° C. for about 7 days, at which time there is inoculated into the yolk sac of the embryo 0.5 ml. of a 10% suspension of Rocky Mountain spotted fever-infected yolk sac membranes. The eggs are kept at 37° C., and death of the embryos occurs after 3 to 4 days. The eggs are then kept at room temperature for 2 to 3 days; the yolk sac membranes are removed aseptically, finely minced and mixed with 9 volumes of sterile distilled water or saline. The suspension is kept in the icebox for several days and is then shaken in a separatory funnel with one volume of ethyl ether at icebox temperature; the mixture is shaken each day for several days, and the aqueous layer is finally drawn off. The ether in the aqueous layer is removed from the liquid by evacuation and, after centrifugation to remove particles of tissue, sodium sulfate is added to a concentration of about 15%. Ammonium sulfate, sodium phosphate, or other salting-out agent may be used in place of sodium sulfate in this step.

After remaining at room temperature overnight, the mixture is centrifuged, and the precipitate is dissolved in 0.1 per cent formalin-saline having a volume of one-tenth the original volume of vaccine. The solution is dialyzed against 0.1% formalin-saline in the icebox to remove sodium sulfate, or other salts, and is then centrifuged to remove insoluble material. It is finally passed through a Berkefeld filter.

When diluted with saline in a ratio of one to five, this solution gives strong complement fixation with sera from patients having Rocky Mountain spotted fever or convalescent from the disease, and does not react with sera from patients having either epidemic or endemic typhus fever.

In place of the chick embryos specifically described, we may use the embryos of other fowl such as ducks, turkeys, geese, guinea hens, etc. However, chicken eggs are usually the cheapest and the most easily obtainable and are preferred.

The exact age of the embryos at the time of inoculation may be from about 5 days to about 10 days when using chicken eggs.

The use of ethyl ether is not considered critical, and other water-immiscible solvents for egg yolk fats such as benzene, carbon tetrachloride, petroleum ether, etc., may be used in extracting fats from the vaccine.

In place of sterile distilled water we may use sterile isotonic sodium chloride solution or other types of sterile diluting solutions. The concentration of formalin should vary from about 0.05% to 0.2% by volume. The amount of formalin which is used should be sufficient to inactivate all of the active, infectious virus but not sufficiently concentrated to destroy the ability of the antigen to give a strong complement fixation with sera of individuals having, or having recovered from, Rocky Mountain spotted fever. In place of formalin we may utilize other chemical or physical methods of inactivation such as light, heat, etc.

The active, infectious agent used for inoculating the yolk sac may be obtained from chick embryo, agar growths, or blood or tissues of animals or humans having the fever in an active stage. The active virus obtained from suspensions of infected yolk sac membranes has been found best suited for carrying out our invention, however.

Other suitable changes or variations may be made by those skilled in the art without departing from the spirit and scope of the invention as defined in the appended claims.

We claim:

1. An antigen extract capable of differentiating between Rocky Mountain spotted fever and typhus fever which comprises a saline solution of the water-soluble antigen prepared from the yolk sacs of fertile eggs previously infected with Rocky Mountain spotted fever virus by extracting an aqueous suspension of said yolk sacs with ether, removing tissue particles from the aqueous extract, adding sodium sulfate, dissolving the resulting precipitated antigen in formalin-saline solution, and removing the sodium sulfate to produce an antigen diagnostic agent.

2. A process for the production of Rocky Mountain spotted fever antigen which comprises infecting the yolk sacs of fertile eggs with the infectious virus of Rocky Mountain spotted fever, incubating the eggs until death of the embryo occurs, mincing the yolk sacs with water, extracting with a water-immiscible fat solvent, removing tissue particles, adding sodium sulfate to the aqueous solution, separating the resulting precipitated antigen, dissolving said antigen in formulin-saline solution, removing the sodium sulfate, and filtering to give a solution containing an antigen capable of identifying Rocky Mountain spotted fever by complement fixation.

3. A process for the production of Rocky Mountain spotted fever antigen which comprises infecting the yolk sacs of fertile eggs with the infectious virus of Rocky Mountain spotted fever, incubating the eggs until death of the embryo occurs, separating the yolk sacs and mincing them with water, extracting with a water-immiscible fat solvent, precipitating the antigen by addition of a salting-out agent, dissolving the precipitate in formalin-saline solution, and filtering to give a specific Rocky Mountain spotted fever antigen.

4. A process for the production of Rocky Mountain spotted fever complement fixation, diagnostic antigen which comprises the steps of incubating fertile eggs for a period of time of from about five days to about ten days, inoculating the yolk sacs of the living embryos with an infectious Rocky Mountain spotted fever Rickettsiae, continuing the incubation of the eggs until death of the embryos occurs, separating the yolk sacs, and preparing an aqueous suspension thereof, extracting the aqueous suspension with ether, centrifuging the aqueous suspension to remove particles of tissue and precipitating the antigen contained therein by means of a salting-out agent, inactivating the virus and separating the precipitated antigen.

5. A process of producing a Rocky Mountain spotted fever complement fixation diagnostic antigen which comprises the steps of incubating fertile eggs for a period of time of from about five days to about ten days, infecting the yolk sac of the living embryo with the Rickettsiae of Rocky Mountain spotted fever, continuing the incubation of the eggs until death of the embryo occurs, separating the yolk sac and preparing an aqueous suspension thereof, extracting the fats from said aqueous suspension with a water-immiscible fat solvent, removing the solvent from the aqueous suspension, centrifuging the aqueous suspension to remove particles of tissue, precipitating the antigen contained therein by the addition of about 15% of sodium sulfate, dissolving the precipitated antigen in a formalin-saline solution, removing the sodium sulfate by dialysis and filtering the dialyzed solution to obtain a product giving strong complement fixation with sera from patients having Rocky Mountain spotted fever.

6. A process for the production of Rocky Mountain spotted fever complement fixation, diagnostic antigen which comprises the steps of incubating fertile eggs for a period of time from about five days to about ten days, inoculating the yolk sacs of the living embryos with infectious Rocky Mountain spotted fever Rickettsiae, continuing the incubation of the eggs until death of the embryos occurs, separating the yolk sacs and preparing an aqueous suspension thereof, extracting the aqueous suspension with a water-immiscible solvent for egg yolk fats, removing solvent and particles of tissue from the aqueous suspension and precipitating the antigenic substances contained therein by addition of a salting-out agent and inactivating the virus associated therewith.

7. A diagnostic antigen capable of differentiating between Rocky Mountain spotted fever and typhus fever by complement fixation which comprises a Rickettsiae-inactivated, precipitated antigen obtained by incubating fertile eggs for a period of time from about five days to about ten days, infecting the yolk sac of the living embryo with the Rickettsiae causing Rocky Mountain spotted fever, continuing the incubation of the eggs until death of the embryo occurs, separating the yolk sac containing water-soluble antigens and Rickettsiae and preparing an aqueous suspension thereof, removing fats and cell tissue from the aqueous suspension, precipitating the antigen and Rickettsiae remaining in the aqueous suspension by addition of a salting-out agent and inactivating the precipitated Rickettsiae to produce a Rocky Mountain spotted fever complement fixation diagnostic antigen.

8. A process for the production of Rocky Mountain spotted fever complement fixation, diagnostic antigen which comprises the steps of incubating fertile eggs for a period of time of from about five days to about ten days, inoculating the yolk sacs of the living embryos with infectious Rocky Mountain spotted fever Rickettsiae, continuing the incubation of the eggs until death of the embryos occurs, separating the yolk sacs and preparing an aqueous suspension thereof containing the Rickettsial bodies and water-soluble antigenic substance of the infected yolk sacs, separating the fats from the antigenic substance, Rickettsial bodies and tissue by extraction with an egg yolk fat solvent and thereafter separating the tissue from the extracted product, separating the water-soluble antigenic substances from the extracted product by addition of a salting-out agent to an aqueous solution thereof, recovering the precipitated antigen, and inactivating the virus associated therewith.

JAMES VANDERSCHEER.
ELIZABETH H. HULL.

REFERENCES CITED

The following references are of record in the file of this patent:

Public Health Reports, Dec. 23, 1938, pages 2241–7; Mar. 20, 1944, pp. 402–6.

J. A. M. A., Dec. 12, 1940, pp. 1218–19.

Science, Apr. 24, 1942, pp. 441–2.

Proc. Soc. Exptl. Biol. and Med., March 1944, pp. 174–6.